United States Patent [19]

Scott

[11] 4,028,191
[45] June 7, 1977

[54] FRACTIONATION COLUMN WITH VAPOR CHANNELING BAFFLES

[75] Inventor: Norman H. Scott, Arlington Heights, Ill.

[73] Assignee: UOP Inc., Des Plaines, Ill.

[22] Filed: June 10, 1976

[21] Appl. No.: 694,871

Related U.S. Application Data

[63] Continuation-in-part of Ser. No. 533,053, Dec. 16, 1974, abandoned.

[52] U.S. Cl. .............................. 202/158; 261/109; 261/114 R
[51] Int. Cl.² ......................................... B01D 3/14
[58] Field of Search ...................... 261/114 R, 109; 202/158, 162

[56] References Cited

UNITED STATES PATENTS

| | | |
|---|---|---|
| 2,702,434 | 2/1955 | Richardson et al. ............ 261/114 R |
| 2,740,697 | 4/1956 | McKay ........................ 261/114 R |
| 2,759,800 | 8/1956 | Hill ............................. 261/114 R |
| 2,819,888 | 1/1958 | Moyer .......................... 261/114 R |
| 2,832,578 | 4/1958 | Gilmore ........................ 261/114 R |
| 3,445,094 | 5/1969 | Shobe .......................... 261/114 R |
| 3,649,466 | 3/1972 | Boon et al. ................... 202/158 |
| 3,899,299 | 8/1975 | Bushnell ....................... 202/158 |

Primary Examiner—Frank W. Lutter
Assistant Examiner—Frank Sever
Attorney, Agent, or Firm—James R. Hoatson, Jr.; Robert W. Erickson; William H. Page, II

[57] ABSTRACT

The efficiency of a fractionation column is increased by the provision of vertical baffles which descend from the lower surface of an upper fractionation tray to a point above the liquid maintained on the next lower fractionation tray and which are oriented perpendicular to the liquid flow across the fractionation tray to thereby segregate the vapors passing through the different portions of the fractionation tray segmented by the baffles.

5 Claims, 3 Drawing Figures

FRACTIONATION COLUMN WITH VAPOR CHANNELING BAFFLES

CROSS-REFERENCE TO RELATED APPLICATION

This application is a continuation-in-part of my co-pending prior application entitled Fractionation Column with Vapor Channeling Baffles, Ser. No. 533,053, filed Dec. 16, 1974, now abandoned

FIELD OF THE INVENTION

The invention relates to an apparatus for the separatory distillation of a mixture of hydrocarbons or inorganic chemicals. The invention also relates to apparatus for vapor-liquid contacting. The invention more particularly relates to a fractionation column wherein there is provided vertical baffles which define zones of mixed vapors between baffles but prevent mixing of vapors between zones.

DESCRIPTION OF THE PRIOR ART

The design of fractionation trays is well known to those skilled in the art. It is known that the efficiency of a fractionation tray is improved if the vapors passing through dissimilar portions of the liquid on the fractionation tray are not allowed to mix after disengaging from the liquid. This is discussed on pages 18–19 and 18–20 of the fourth Edition of *The Chemical Engineers' Handbook* published by McGraw-Hill Book Co.

Representative examples of fractionation apparatus are shown by U.S. Pat. Nos. 2,819,888 (Cl. 261-114); 2,832,578; 3,410,540 (Cl. 261-113) and 3,700,216 (Cl. 261-114 R). U.S. Pat. No. 3,445,094 presents an apparatus in which the flow of liquid across various sections of the tray is adjusted to match the rate of upward vapor flow through each corresponding section. This is achieved by providing baffled sections on the bottom edge of the outlet side of the downcomers. The baffles serve to reduce the area available for liquid flow and thereby reduce the liquid flow under this side of the downcomer. This reference is therefore limited to the control of horizontal liquid flow, and the baffles of the reference are completely covered with liquid. In contrast the subject invention is directed to channeling vertical vapor flow, and the vapor baffles described herein terminate at a point above the liquid level maintained upon the tray. Furthermore, the subject vapor baffles are not attached or connected to the downcomer means.

SUMMARY OF THE INVENTION

The invention provides an apparatus for fractional distillation which comprises an upper first and a lower second fractionation tray horizontally disposed across a vertically oriented cylindrical outer vessel in which there is provided at least one vertical vapor baffle extending downward from a point substantially adjacent the lower surface of the upper fractionation tray to a point above the liquid level on the lower fractionation tray, with the vapor baffle being oriented substantially perpendicular to a horizontal straight line connecting the vertical centerlines of the downcomer means associated with these two fractionation trays. The vapor baffle is not a part of any downcomer means used in the apparatus.

DESCRIPTION OF THE DRAWING

In FIG. 1, cylindrical wall 1 is the outer wall of a vertically oriented cylindrical outer vessel which forms the main body of the fractionation column. There is shown an upper first fractionation tray 2 and a lower second fractionation tray 2' horizontally disposed across the fractionation column. These fractionation trays are substantially identical. A large number of perforations 3 are provided in the vapor-liquid contacting area of the fractionation trays to allow the upward passage of a vapor phase material. A downcomer means 4 extends from a third tray not shown and directs the flow of descending liquid to the fractionation tray 2. A flow control means 7, illustrated as a semi-circular weir attached to the inner surface of the vertical wall 1, extends upward above the bottom open end of the downcomer means 4 to provide a liquid seal which prevents the flow of vapor phase material upward through the downcomer. A second downcomer means 5 transfers material which flows into the upper open end of this downcomer to the lower fractionation tray 2'. A liquid seal is maintained at the bottom of this downcomer by a liquid flow control means 8. A third downcomer means 6 is provided for the removal of liquid from the lower fractionation tray. A section of each downcomer extends above the upper surface of the corresponding tray to form a weir which retains liquid on the tray. These elements of the apparatus are built in conformity with the prior art. The invention comprises the provision of at least one vertical vapor baffle 9 between the fractionation trays. The vapor baffles extend from a point at or near the lower surface of the upper fractionation tray to an elevation expected to be slightly above the maximum liquid level which will normally occur on the lower fractionation tray. This will require the baffles to extend downward for a distance greater than one-half of that between the two trays.

In FIG. 2, it may be seen that the vapor baffles 9 extend across the fractionation column and terminate at points adjacent to the inner surface of the cylindrical wall 1. The perforations 3 in the vapor-liquid contacting area of the fractionation tray 2' are illustrated on a portion of the surface of this tray. Downcomer means 5 delivers incoming liquid to the left-hand side of the fractionation tray. The semi-circular structure of the flow control means 8 is apparent in this view. The second downcomer means 6 is shown located on the extreme right-hand side of the tray directly across from the downcomer means 5 to thereby require the liquid to flow laterally across the fractionation tray. The vapor baffles 9 are oriented perpendicular to this liquid flow, which is the same as being oriented perpendicular to a horizontal line connecting the vertical centerlines of the two downcomer means.

FIG. 3 illustrates a different embodiment of the invention. In this embodiment the vapor baffles 19 extend downward for a distance which is less than one-half of the distance between the fractionation trays 11 and 12. The cylindrical wall 10 represents the outer structure of the fractionation column. A chordal downcomer 14 which is delineated by a vertical wall and the inner surface of wall 10 delivers liquid to the upper fractionation tray 11. A second chordal downcomer means 15 transfers liquid to the lower fractionation tray 12, and a third downcomer means 16 removes liquid from the fractionation tray 12. The vertical weir 17 provides a liquid seal at the bottom of the downcomer 14, and the vertical weir 18 provides a liquid seal at the bottom of the downcomer 15. Again, the walls forming the downcomers extend above the surface of the fractionation tray to form outlet liquid flow control means which set the liquid level on the tray. A large number of small perforations 13 are utilized as the vapor-liquid contacting means which allows the upward passage of the vapor phase material passing through the fractionation column.

DETAILED DESCRIPTION

Figure 1:
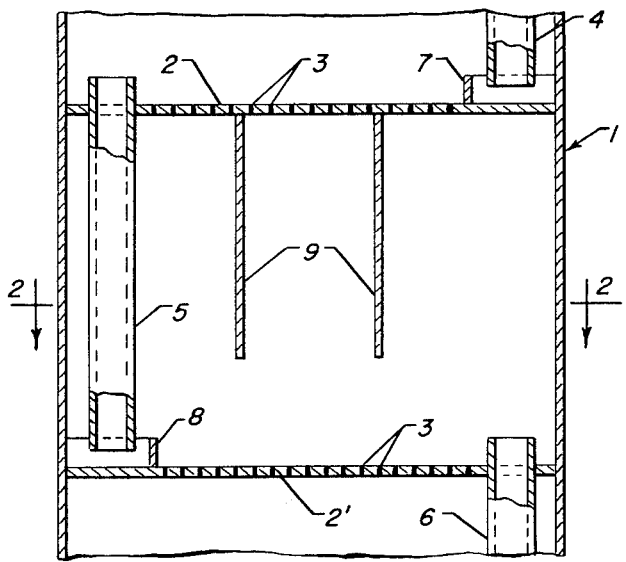
FIG. 1 presents a vertical cross-section of a portion of a fractionation column.
Figure 2:
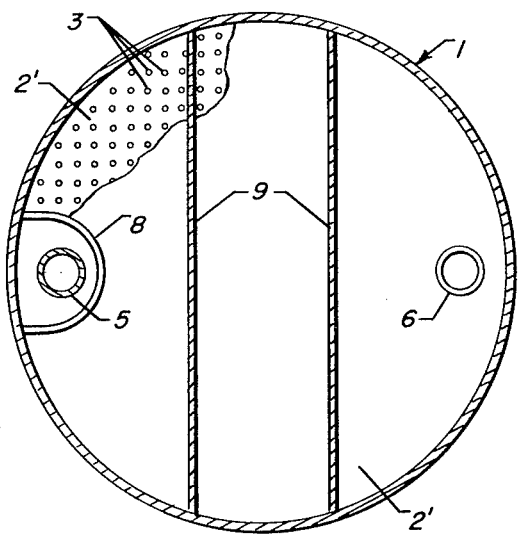
FIG. 2 presents a horizontal cross-section taken through the fractionation column shown in FIG. 1.

The separation of various mixtures of hydrocarbons or inorganic chemicals by fractional distillation is widely practiced in the chemical processing and petroleum industries. Those skilled in the art are therefore quite knowledgeable in the construction and operation of the apparatus needed to perform this process. Almost without exception, the process is carried out within a fractionation column contained within an elongated cylindrical vertical outer vessel. The invention relates to those instances where fractionation trays rather than packing are used within this vessel. The fractionation trays are horizontally disposed across the internal volume of the fractionation column at selected distances set by the materials fractionated and the operating conditions imposed. The periphery of these fractionation trays has substantially the same shape as the inner surface of the fractionation column. The fractionation trays are adapted to serve as liquid support plates which retain a body of liquid which is contacted with a rising stream of vapor. This is accomplished by providing substantially liquid-tight seals along the periphery of the tray and at any joints between components of the tray. A large percentage of each tray is devoted to the provision of a vapor-liquid contacting area. This area of the tray may be covered with any of the several types of vapor-liquid contacting means known to those skilled in the art. For instance, the tray may have a number of small perforations, as in a sieve-type tray, or the tray may support a number of bubble caps. The vapor passageways in the tray may also be formed by horizontal slots pressed through the surface of the tray or a number of mechanical valving arrangements.

There are normally at least two downcomer means associated with each intermediate fractionation tray. One of the these downcomer means delivers a liquid stream to the tray, and the other downcomer means removes a liquid stream from the tray. In the preferred embodiment of the invention there is only one outlet downcomer means associated with each tray, and the outlet downcomer means is located on the opposite side of the tray from the outlet downcomer means of the tray directly above it. That is, in the preferred embodiment the number of downcomers used in the apparatus does not exceed the number of trays used in the apparatus. The inlet and outlet downcomers are located on opposite sides of each individual fractionation tray. This forces the liquid descending through the fractionation column to pass laterally across the fractionation tray from one downcomer means to the other. However, the invention is not limited to such "full cross" decks. For instance, two downcomers located at opposing positions on the same tray may be used as the outlet downcomers and a single centrally located downcomer may be used as the inlet downcomer. The function of these downcomers will alternate between the vertically contiguous trays within the column. Two inlet and two outlet downcomers may also be used on each tray.

The upper open end and the lower open end of each downcomer means may be surrounded by a liquid flow control means. These flow control means are typically a vertical imperforate weir. If a flow control means is placed at the bottom of the downcomer which feeds liquid to the fractionation tray, it will extend upward to a point above the lower open end of the downcomer means to provide a liquid seal which prevents the upward passage of vapor through the downcomer. An outlet flow control means surrounding the upper open end of the downcomer will normally extend upward to a height equal to the minimum liquid level which it is desired to maintain upon the fractionation tray at this point. This flow control means is preferably a vertical imperforate wall attached to the upper surface of the tray and having a horizontal upper lip, such as the weirs shown in the drawing. The upper edge of the liquid flow control means may alternatively have V-shaped notches or baffles. The outlet flow control means may be designed to provide a sufficient liquid level to seal the bottom of the downcomers to thereby eliminate the inlet flow control means.

Figure 3:
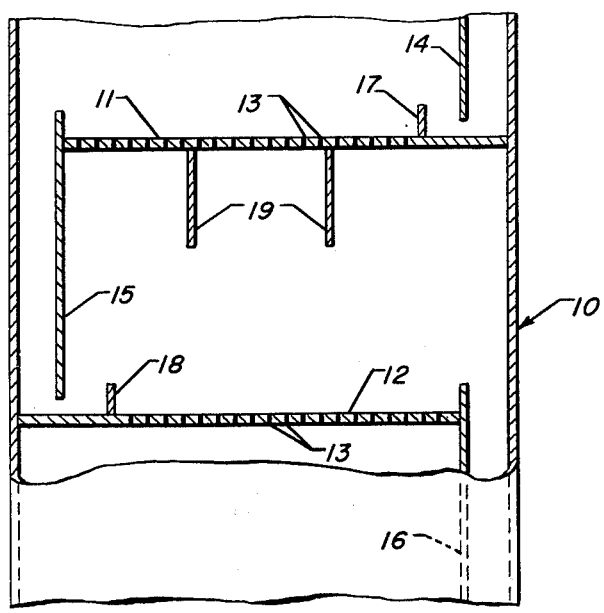
FIG. 3 presents a vertical cross-section of a fractionation column having two chordal downcomers and in which the length of the vapor baffles is reduced.

The downcomers are preferably constructed by attaching a vertical wall to the tray where a section has been removed to thereby form a chordal downcomer similar to that shown in FIG. 3. Alternatively, vertical cylindrical conduits may be used. The downcomers preferably extend directly downward to the tray next below. The direction of the liquid flow will therefore preferably alternate on each fractionation tray from the direction on the tray directly above or below it.

The invention comprises the provision of a vertical vapor baffle which extends downward from an upper fractionation tray to a point above a lower fractionation tray. This vapor baffle is preferably oriented to lie in a plane perpendicular to the most direct liquid flow across the fractionation tray. Since the liquid will flow between two downcomer means, this is equivalent to orienting the vapor baffle perpendicular to a horizontal straight line which is drawn between the vertical centerlines of the inlet downcomer means and the outlet downcomer means. The vapor baffle preferably abuts the lower surface of the upper fractionation tray and forms a substantially vapor-tight seal against this surface. However, the invention will still function when a limited space is provided between the top of the vapor baffle and the lower surface of the upper tray. This space should not be sufficient to allow excessive intermixing of the vapor at the top of the baffle. It is therefore preferred that the vapor baffle be substantially adjacent to this lower surface. By "substantially adjacent", it is intended to limit the distance between the upper horizontal edge of the vapor baffle and the lower surface of the fractionation tray immediately above it to less than about one-quarter inch. The vapor baffle preferably extends across the entire distance of a chord drawn across the internal volume of the column. That is to say, the vertical edges of the vapor baffle preferably also form a vapor-tight seal against the vertical inner surface of the fractionation column. Again, this is not a necessity for the successful utilization of the invention and a small gap may be provided. It is sufficient that the vapor baffle merely contact the opposing surface, and it is not necessary that the vapor barrier be physically attached to this surface or to the fractionation tray.

In the preferred embodiment of the invention, the vapor baffle extends downward for at least one-half the distance between the two contiguous fractionation trays. The vapor baffle preferably extends downward to the point just above where it is expected that the liquid normally present on the lower fractionation tray will have its upper surface. The preferred construction utilizes the longest baffle that will not distort the vapor flow or hinder liquid flow to the extent that the capacity of the column for liquid is reduced. That is, the vapor baffle should not extend downward into the liquid to thereby obstruct the liquid flow. The vapor baffle may extend extensively downward into the froth layer above the liquid since the froth will often extend well above the liquid. Any obstruction of the flow of the liquid will produce different effective liquid levels on the opposite sides of the tray. This in turn produces unequal vapor rates, with the slowest rate being on the liquid inlet side of the barrier. This is an undesirable situation.

The liquid level on a tray is set by a weir or other liquid flow control means on the outlet downcomer. The lower edge of the vapor baffle should therefore be above the surface of this weir or means over which the liquid flows. However, a gradient in the liquid level may be present on the tray, with the liquid level being greater at the inlet downcomer. To allow for this gradient the term liquid level as used herein is intended to refer to an elevation above the upper surface of the tray which is one inch above the upper edge of the outlet liquid flow control means.

The vapor barrier preferably comprises a flat, imperforate, vertical wall. The vapor barrier may however be formed from a perforated wall or from a screen. This would allow for some vapor passage and the equalization of vapor flow rates on both sides of the barrier. These perforations may be exclusively in the bottom of the barrier to provide liquid passageways which assure that the barrier will not obstruct the liquid flow and if used might allow the barrier to extend to the top of the tray beneath it as for support. The vapor barrier may be hung from the lower surface of the upper fractionation tray, supported by the lower tray, or attached to the walls of the column or combinations of these three. The barrier will not be subjected to substantial structural forces, and for this reason may be formed from a relatively light weight piece of sheet metal or other material of a composition similar to the other structures within the column. The vapor barrier could also be formed by a demisting pad or one or more perforated plates.

The vapor barrier functions to prevent the mixing of vapors passing through widely separated portions of the liquid flowing across the tray. The liquid which is fed to the tray has a substantially uniform composition equal to that of a liquid leaving the tray above. As this liquid passes across the tray, some of the more volatile components are lost to the upward passing vapor and less volatile components are picked up from this vapor. The composition of the liquid on the tray therefore varies along a line drawn from the inlet downcomer to the outlet downcomer. The vapor which passes through this liquid at different points and which to at least some degree approaches equilibrium with this liquid, will therefore also have a different composition. By limiting the mixture of the vapor above the fractionation tray and causing it to pass directly upward, these differences in composition are maintained until this vapor passes through the liquid on the tray next above. Such segmenting of the vapor flow increases the number of mass transfer stages and thus improves the separation capability of the column. Although the invention is illustrated in the drawings with two vapor barriers, it is within the scope of the invention to vary this segmenting by providing a single vapor barrier or three or more vapor barriers.

The invention may be characterized as an apparatus for fractional distillation which comprises a vertically oriented cylindrical outer vessel having an internal volume; an upper first fractionation tray horizontally disposed across the internal volume of said outer vessel and having a lower surface; a second fractionation tray having an upper surface adapted to support a liquid and froth thereupon and horizontally disposed across the internal volume of said outer vessel below said first fractionation tray, said first and second fractionation trays being vertically contiguous; a first downcomer means extending downward from said first fractionation tray to a point above said second tray; a second downcomer means having an upper inlet opening and extending downward from said second fractionation tray; an outlet liquid flow control means comprising a vertical weir attached to the upper surface of said second fractionation tray and operatively positioned at the upper inlet opening of said second downcomer means; and, a vertical vapor baffle, said baffle comprising a means distinct and separate from a downcomer means, extending downward from said lower surface of said first fractionation tray to a point above said outlet liquid flow control means and above the liquid level on said second fractionation tray, said vapor baffle being oriented substantially perpendicular to a horizontal straight line between the vertical centerlines of said first downcomer means and said second downcomer means, said vapor baffle abutting the lower surface of the first tray.

I claim as my invention:

1. An apparatus for fractional distillation which comprises:
   a. a vertically oriented cylindrical outer vessel having an internal volume;
   b. an upper first fractionation tray horizontally disposed across the internal volume of said outer vessel and having a lower surface;
   c. a second fractionation tray having an upper surface adapted to support a liquid and froth thereupon and horizontally disposed across the internal volume of said outer vessel below said first fractionation tray, said first and second fractionation trays being vertically contiguous;
   d. a first downcomer means extending downward from said first fractionation tray to a point above said second tray;
   e. a second downcomer means having an upper inlet opening and extending downward from said second fractionation tray;
   f. an outlet liquid flow control means comprising a vertical weir attached to the upper surface of said second fractionation tray and operatively positioned at the upper inlet opening of said second downcomer means; and, g. at least two substantially parallel, planar, vertical vapor baffles of substantially equal length, said baffles comprising a means distinct and separate from a downcomer means, and extending downward from said lower surface of said first fractionation tray to a common lever above said outlet liquid flow control means and above the liquid level on said second fractionation tray to a common length sufficient to minimize intermixing of vapor around the tops of said vapor baffles, said vapor baffles being oriented substantially perpendicular to a horizontal straight line between the vertical centerlines of said first downcomer means and said second downcomer means, said vapor baffles abutting the lower surface of the first tray.

2. the apparatus of claim 1 further characterized in that said vapor baffles are imperforate.

3. The apparatus of claim 1 in which said first and second downcomer means comprise chordal downcomers.

4. The apparatus of claim 3 in which the number of downcomer means used within the apparatus does not exceed the number of fractionation trays used within the apparatus.

5. The apparatus of claim 3 in which said vapor baffles extends downward for at least one-half of the vertical distance between said first and second downcomer means.

* * * * *